United States Patent
Moran et al.

(10) Patent No.: US 9,741,134 B2
(45) Date of Patent: Aug. 22, 2017

(54) METHOD AND APPARATUS FOR DIMENSIONING BOX OBJECT

(71) Applicant: SYMBOL TECHNOLOGIES, INC., Lincolnshire, IL (US)

(72) Inventors: Mark Moran, Tel-Aviv (IL); Menahem Diamantstein, Tel Aviv-Yaffo (IL); Joel Nahum, Shoham (IL); Eyal Katz, Ramat Gan (IL)

(73) Assignee: Symbol Technologies, LLC, Holtsville, NY (US)

( * ) Notice: Subject to any disclaimer, the term of this patent is extended or adjusted under 35 U.S.C. 154(b) by 618 days.

(21) Appl. No.: 14/107,208

(22) Filed: Dec. 16, 2013

(65) Prior Publication Data
US 2015/0170378 A1   Jun. 18, 2015

(51) Int. Cl.
    G06K 9/00    (2006.01)
    G06T 7/60    (2017.01)
    G06K 9/46    (2006.01)
    G06T 7/00    (2017.01)
    G06T 7/62    (2017.01)

(52) U.S. Cl.
    CPC ............ G06T 7/602 (2013.01); G06K 9/4604 (2013.01); G06T 7/0004 (2013.01); G06T 7/62 (2017.01); G06T 2207/10132 (2013.01); G06T 2207/20061 (2013.01)

(58) Field of Classification Search
None
See application file for complete search history.

(56) References Cited

U.S. PATENT DOCUMENTS

| | | | |
|---|---|---|---|
| 7,310,431 B2 | 12/2007 | Gokturk et al. | |
| 7,527,205 B2 | 5/2009 | Zhu et al. | |
| 7,726,575 B2* | 6/2010 | Wang | G01B 11/25 235/462.2 |
| 8,132,728 B2* | 3/2012 | Dwinell | G06T 7/60 235/440 |
| 8,284,988 B2 | 10/2012 | Sones et al. | |
| 8,978,984 B2* | 3/2015 | Hennick | G06K 7/10732 235/462.41 |
| 9,080,856 B2* | 7/2015 | Laffargue | G01B 11/002 |
| 9,396,554 B2* | 7/2016 | Williams | G01B 11/00 |
| 9,600,892 B2* | 3/2017 | Patel | G06T 7/11 |
| 2001/0027995 A1* | 10/2001 | Patel | G06K 7/10861 235/383 |
| 2002/0118874 A1* | 8/2002 | Chung | G06T 17/10 382/199 |

(Continued)

FOREIGN PATENT DOCUMENTS

WO   2008154611 A2   12/2008

*Primary Examiner* — Soo Park
(74) *Attorney, Agent, or Firm* — Yuri Astvatsaturov

(57) ABSTRACT

A method to determine the volume of a box object from the captured image of the box object. The method includes identifying a geometric mark on the box object in the captured image to find the positions of two reference points of the geometric mark. The two reference points are separated by a predetermined distance. The method also includes processing a group of parameters and a predetermined mapping obtained from a calibration process. The group of parameters includes the positions of the two reference points and the predetermined distance separating the two reference points.

23 Claims, 13 Drawing Sheets

(56) References Cited

U.S. PATENT DOCUMENTS

| | | | |
|---|---|---|---|
| 2002/0141660 A1* | 10/2002 | Bellavita | G06K 9/2054 |
| | | | 382/309 |
| 2003/0228057 A1* | 12/2003 | Paquette | G06K 9/32 |
| | | | 382/199 |
| 2005/0259847 A1* | 11/2005 | Genc | G06T 7/194 |
| | | | 382/103 |
| 2007/0237356 A1* | 10/2007 | Dwinell | B07C 3/14 |
| | | | 382/101 |
| 2009/0078774 A1* | 3/2009 | He | G06K 7/10722 |
| | | | 235/462.41 |
| 2010/0202702 A1* | 8/2010 | Benos | G06T 7/602 |
| | | | 382/200 |
| 2013/0101158 A1 | 4/2013 | Lloyd et al. | |
| 2013/0329013 A1* | 12/2013 | Metois | H04N 13/0203 |
| | | | 348/46 |
| 2014/0027503 A1* | 1/2014 | Kennedy | G06F 17/30265 |
| | | | 235/375 |
| 2014/0104413 A1* | 4/2014 | McCloskey | G06Q 10/083 |
| | | | 348/135 |
| 2014/0104416 A1* | 4/2014 | Giordano | G01B 11/02 |
| | | | 348/135 |
| 2014/0239071 A1* | 8/2014 | Hennick | G06K 7/10732 |
| | | | 235/455 |
| 2015/0161427 A1* | 6/2015 | Guo | G06K 7/146 |
| | | | 235/462.08 |
| 2015/0187091 A1* | 7/2015 | Hata | G01B 11/02 |
| | | | 382/101 |

* cited by examiner $$\begin{pmatrix} 3489.109 & 0 & 1664.985 \\ 0 & 3483.357 & 1151.856 \\ 0 & 0 & 1 \end{pmatrix}$$

FIG. 9A $$\begin{pmatrix} 2476.736 & 0 & 1275.404 \\ 0 & 2471.348 & 979.613 \\ 0 & 0 & 1 \end{pmatrix}$$

FIG. 9B

METHOD AND APPARATUS FOR DIMENSIONING BOX OBJECT

BACKGROUND

While many imaging systems can be used to capture images of a box object, most of the imaging systems do not have the functions to estimate the volume or the three box dimensions (i.e., the length, the width, and the height) of the box object from the captured images. There is a need for a method and apparatus for determining sizes of a box object conveniently based on image processing principles.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 9A shows a calibration matrix for a first example imaging system in accordance with some embodiments, and FIG. 9B shows a calibration matrix for a second example imaging system in accordance with some embodiments.

Figure 1A:
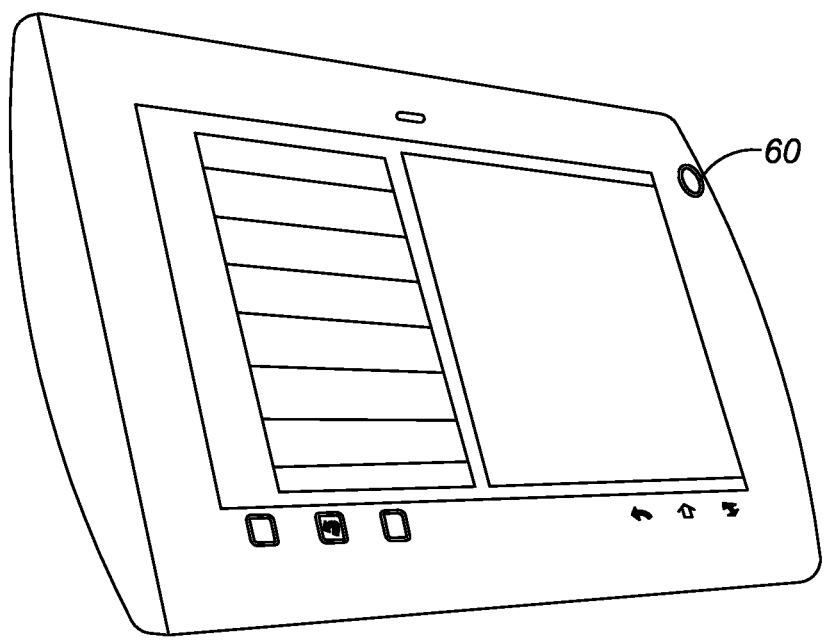
FIG. 1A and FIG. 1B are examples of imaging systems in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method includes detecting light from a box object through an imaging lens arrangement with an imaging sensor having two-dimensional photosensitive elements to capture at least one image of the box object. The box object has the shape of a rectangular solid. The method also includes identifying at least six corners of the box object to find the positions of the at least six corners in the at least one image, and identifying a geometric mark with fixed dimensions on the box object in the at least one image to find the positions of at least two reference points of the geometric mark in the at least one image. The at least two reference points are separated by a predetermined distance. The method still includes processing a group of parameters and a predetermined mapping to determine one of (a) the volume of the box object and (b) the box dimensions of the box object. The box dimensions include the width, the length, and the height of the box object. The group of parameters includes (1) the positions of the at least six corners in the at least one image, (2) the positions of the at least two reference points in the at least one image, and (3) the predetermined distance separating the at least two reference points. The predetermined mapping is operative to establish a one-to-one corresponding relationship between a point in an image plane of the imaging sensor and a point in a reference plane in physical space.

Figure 1B:
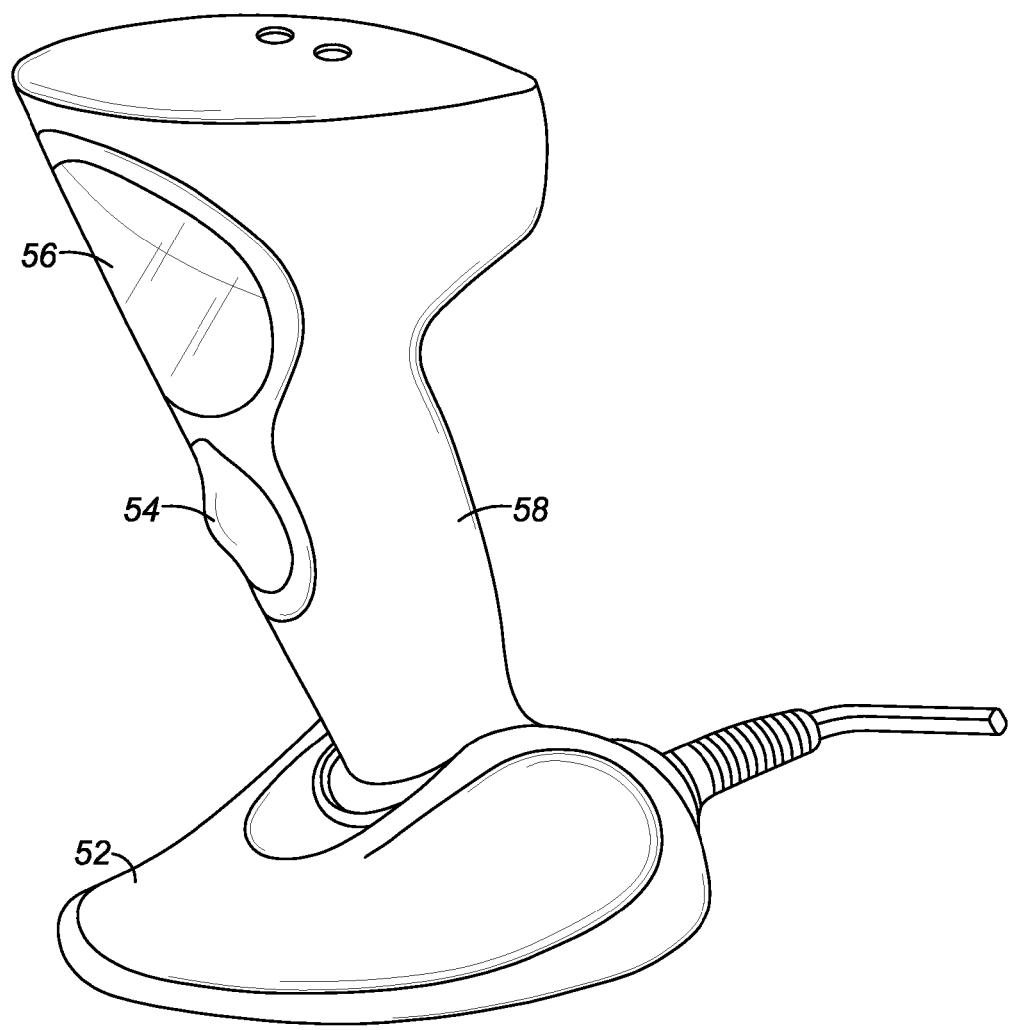

There are many imaging systems that can be used to capture images of a box object. Examples of these imaging systems include the tablet computer as shown in FIG. 1A, and the imaging scanner 50 as shown in FIG. 1B. Other examples of imaging systems are a digital camera and a cellular telephone. FIG. 1B shows an imaging scanner 50 for implementation of the present invention. The imaging scanner 50 has a window 56 and a housing 58 with a handle. The imaging scanner 50 also has a base 52 for supporting itself on a countertop. The imaging scanner 50 can be used in a hands-free mode as a stationary workstation when it is placed on the countertop. The imaging scanner 50 can also be used in a handheld mode when it is picked up off the countertop and held in an operator's hand. In the hands-free mode, products can be slid, swiped past, or presented to the window 56. In the handheld mode, the imaging scanner 50 can be moved towards a barcode on a product, and a trigger 54 can be manually depressed to initiate imaging of the barcode. In some implementations, the base 52 can be omitted, and the housing 58 can also be in other shapes. In FIG. 1B, a cable is also connected to the base 52. In other implementations, when the cable connected to the base 52 is omitted, the imaging scanner 50 can be powered by an on-board battery and it can communicate with a remote host by a wireless link.

Figure 2:
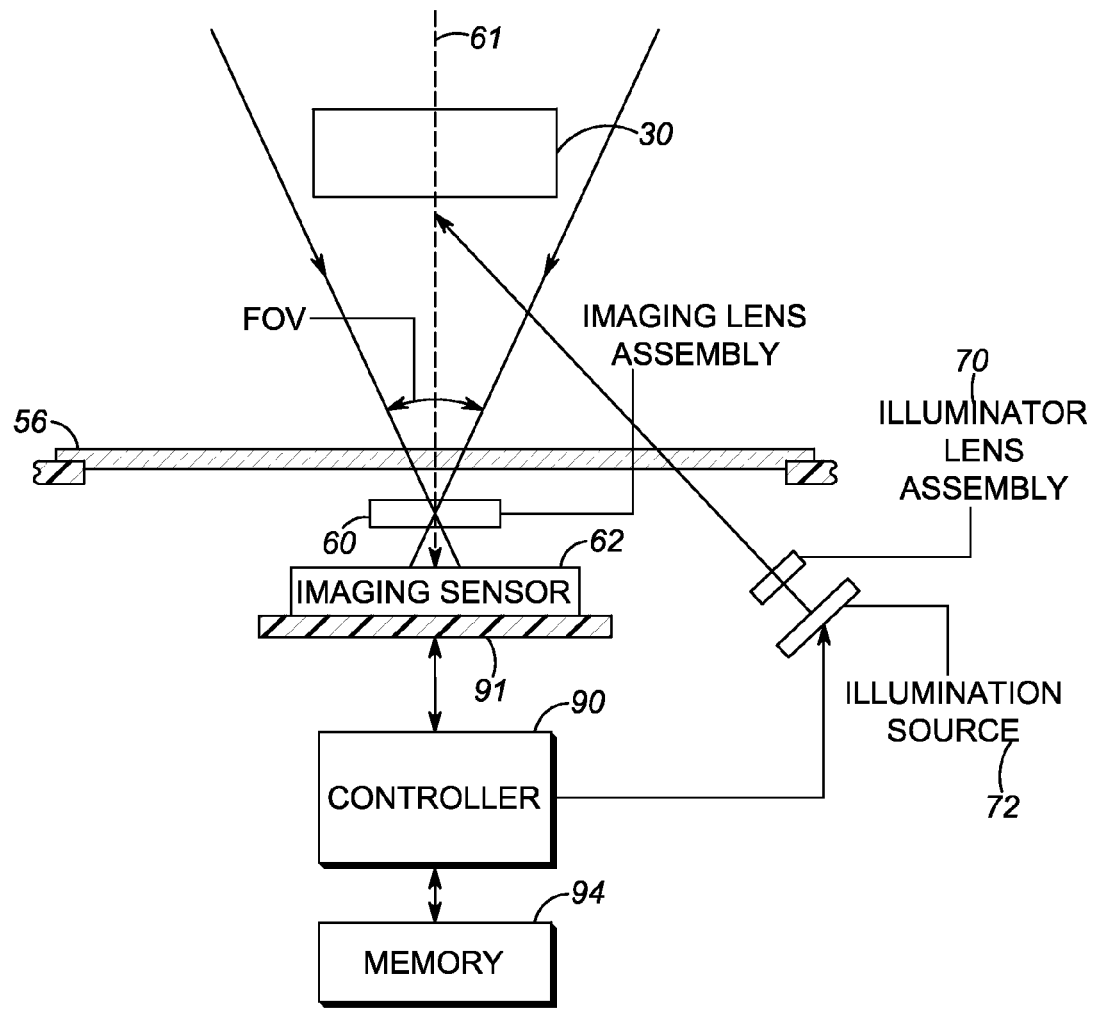
FIG. 2 is a schematic of an imaging system in accordance with some embodiments.

FIG. 2 is a schematic of an imaging system 50 in accordance with some embodiments. The imaging system 50 in FIG. 2 includes the following components: (1) an imaging sensor 62 positioned behind an imaging lens arrangement 60; (2) an illuminating lens arrangement 70 positioned in front of an illumination source 72; and (3) a controller 90. In FIG. 2, the imaging sensor 62 is mounted on a printed circuit board 91 in the imaging system.

The imaging sensor 62 can be a CCD or a CMOS imaging device. The imaging sensor 62 generally includes multiple pixel elements. These multiple pixel elements can be formed by a two-dimensional array of photosensitive elements arranged in mutually orthogonal rows and columns. The imaging sensor 62 is operative to detect light captured by an imaging lens arrangement 60 along an optical path or axis 61 through the window 56. Generally, the imaging sensor 62 and the imaging lens arrangement 60 are designed to operate together for capturing light scattered or reflected from a target object (e.g., the box object 30) as pixel data over a two-dimensional imaging field of view (FOV).

Figure 3:
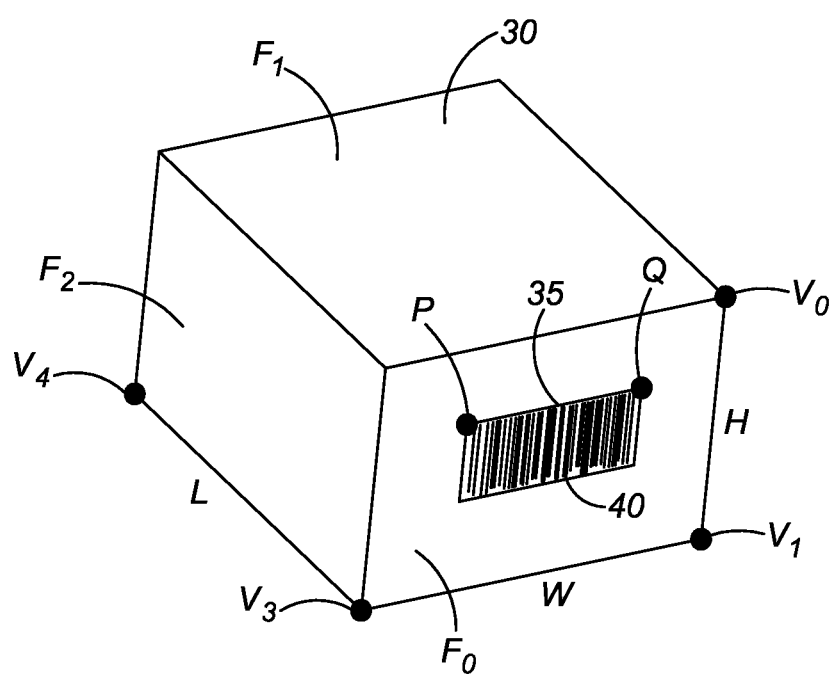
FIG. 3 shows that a barcode placed on the surface of a box object.

In many operation environments, as shown in FIG. 3, the barcode 40 is placed on one or more sides of a box object 30, and the imaging system 50 is often used to decode the barcode 40 for identifying the box object or finding other information of the box object. In some operation environments, the user also has to estimate the dimensions or the volume of the box object using additional equipment. It is recognized that it would be desirable to use the imaging system 50 to perform the function of estimating the dimensions or the volume of the box object 30.

In accordance with some embodiments, if the size of the barcode 40 (e.g., its width or its length) is known, the volume or the three box dimensions (i.e., the length, the width, and the height) of the box object 30 can be estimated if the box object 30 and the barcode 40 are both captured in an image by the imaging system 50. In general, if the distance between two points on a geometric mark 35 on the box object 30 is known, the volume or the three box dimensions of the box object 30 can be estimated from the image of the box object 30 as captured by the imaging system 50. Examples of the geometric mark 35 include a one-dimensional barcode, a two-dimensional barcode, a logo, a shipping label, or the combination of isolated point marks printed on the face of the box object 30.

Figure 4B:
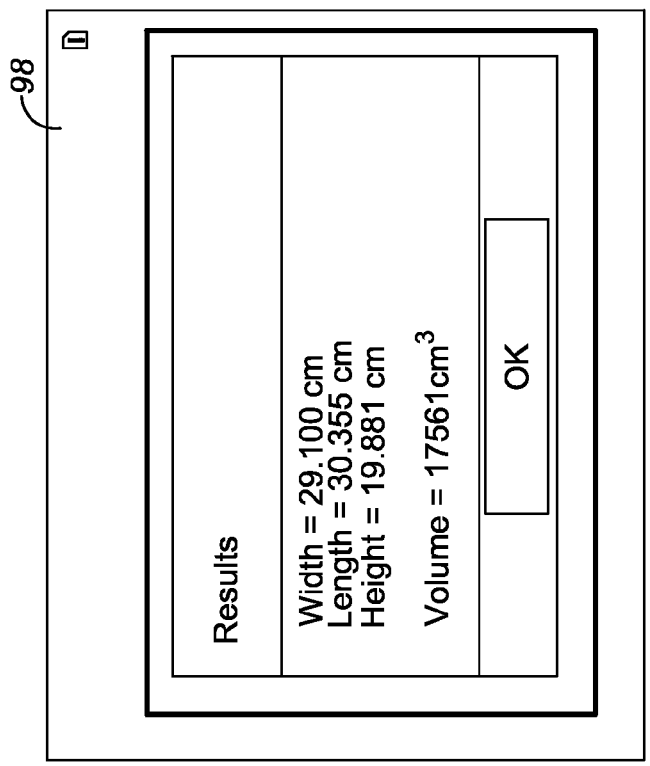
FIG. 4B is an example of a display screen on which the box dimensions and the volume of the box object are displayed in accordance with some embodiments.
Figure 4A:
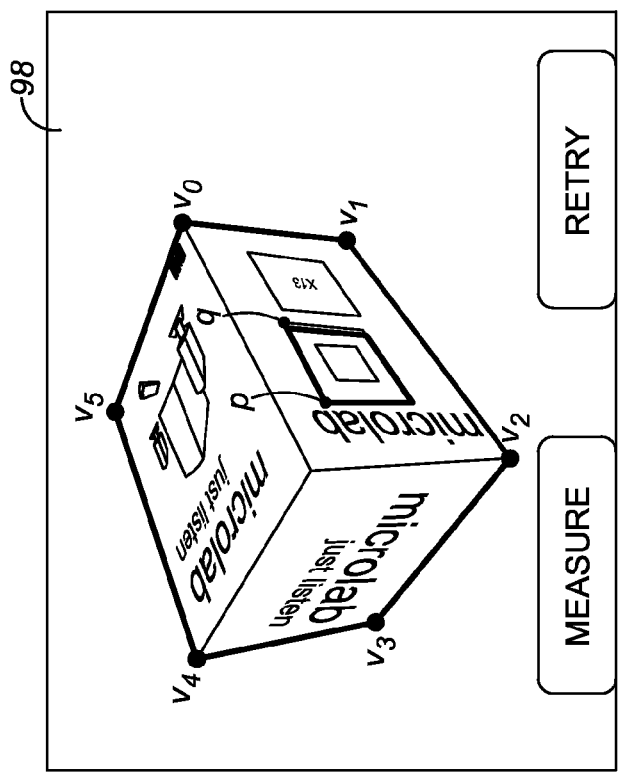
FIG. 4A is an example of a display screen that shows a captured image of the box object with the geometric mark on one face of the box object in accordance with some embodiments.

FIG. 4A is an example of a display screen 98 that shows a captured image of the box object 30 with the geometric mark 35 on one face of the box object 30 in accordance with some embodiments. In this example, the geometric mark 35 has the shape of a rectangular solid, and two corner points of the geometric mark 35 are used as two reference points "P" and "Q" on a surface of the box object 30 as shown in FIG. 3. In FIG. 4A, these two reference points in the captured image are labeled as "p" and "q". The positions of these two reference points in the captured image can be identified automatically with the imaging system 50 by performing certain image processing algorithm on the captured image as in FIG. 4A. In some implementations, after an identified position is displayed on the display screen 98 as shown in FIG. 4A, the identified position can be confirmed by a user. In some implementations, the positions of the reference points in the captured image can be identified by the user manually; for example, the user can visually choose a user-selected position on the display screen as the identified position, after the captured image is displayed on the display screen. In some embodiments, more than two reference points are used for performing required calculation or algorithm, the position of any of these more than two reference points in the captured image can be identified automatically with the imaging system 50 or identified by the user manually on the display screen 98.

Figure 5A:
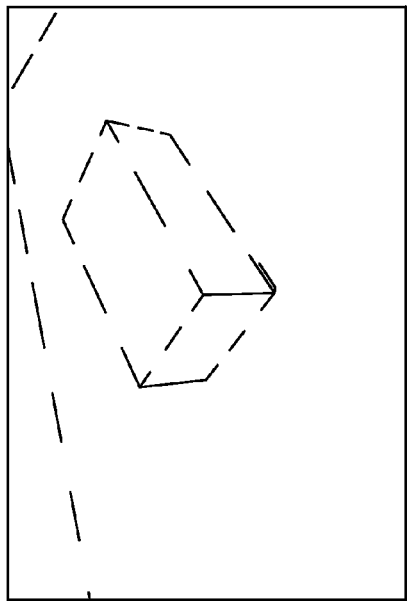
FIG. 5A shows a captured image of a box object in accordance with some Embodiments.
Figure 5B:
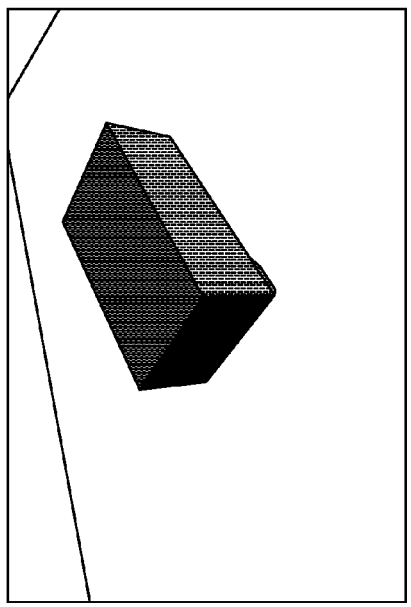
FIG. 5B shows some edge lines in the captured image in accordance with some embodiments
Figure 5C:
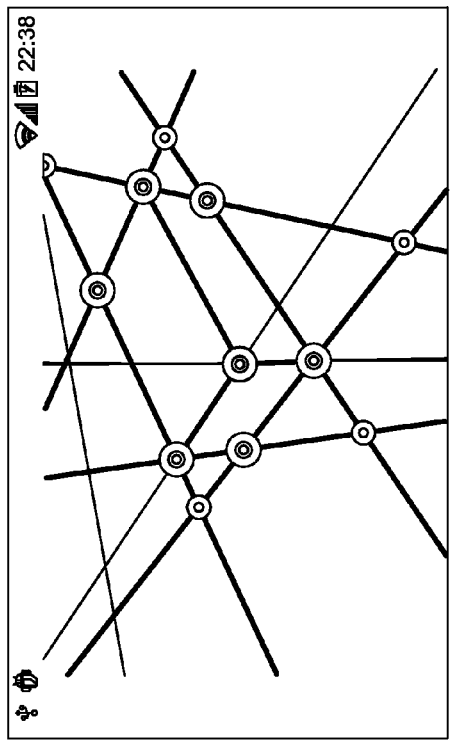
FIG. 5C shows some points in the captured image that are selected as candidates for using as the corner points of the box object in accordance with some embodiments.

Similarly, the box object in the captured image can be identified by the six corners $v_0$, $v_1$, $v_2$, $v_3$, $v_4$, and $v_5$, and the positions of these six corner points of the box object in the captured image can be identified automatically with the imaging system 50 by performing certain image processing algorithm on the captured image as shown in FIGS. 5A-5C. Specifically, FIG. 5A shows a captured image of a box object, FIG. 5B shows that some edge lines in the captured image are determined, and FIG. 5C shows that some points in the captured image (e.g., some cross points of the edge lines) are selected as candidates for using as the corner points of the box object.

Figure 6:
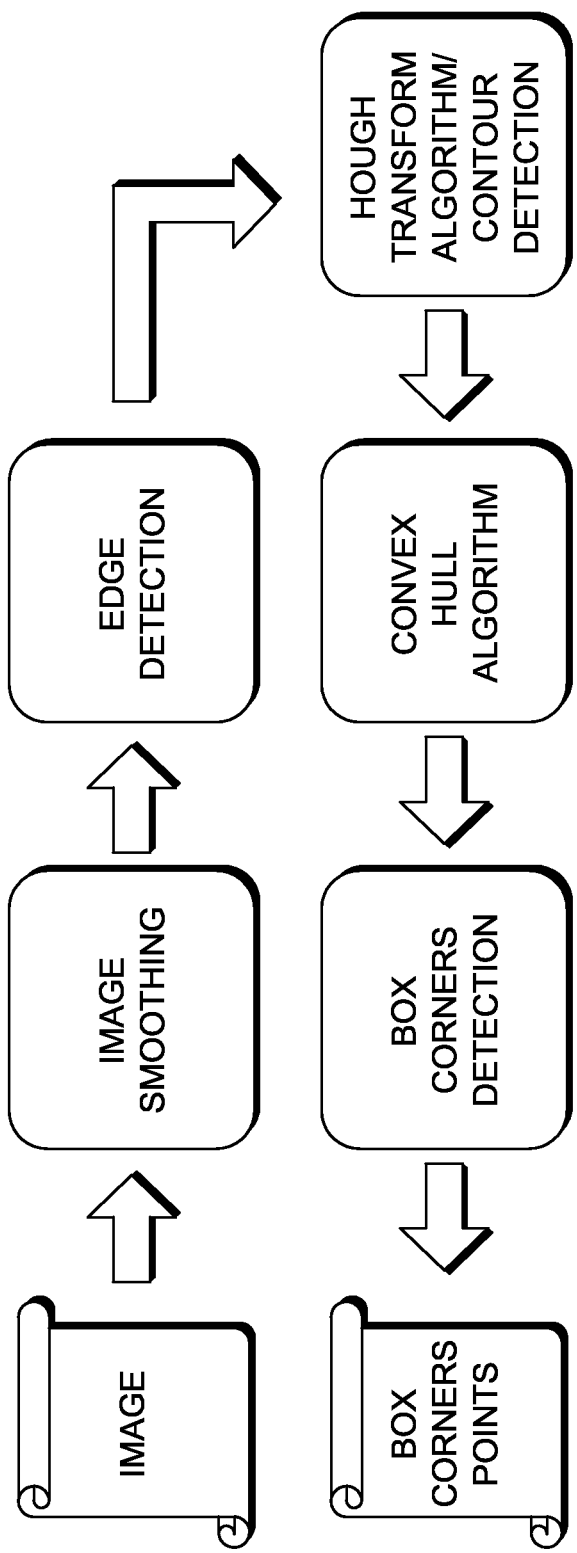
FIG. 6 is a flowchart showing one method of identifying corner points in the captured image in accordance with some embodiments.

FIG. 6 a flowchart showing one method of identifying corner points in the captured image in accordance with some embodiments. The image processing algorithm used in FIG. 6 includes smoothing such as Gaussian Blur, detection such as Canny algorithm, Hough transform algorithm with contour detection, Convex Hull algorithm, and box corners detection. It will be appreciated by those of ordinary skill in the art that other image processing algorithms may be alternatively used for automatically identifying the corner points. In some implementations, after an identified position is displayed on the display screen, such identified position can be confirmed by the user. In some implementations, the positions of the corner points of the box object in the captured image can be identified by the user manfully; for example, the user can visually chose a user-selected position on the display screen as the identified position, after the captured image is displayed on the display screen.

Once the positions of the six corners (e.g., $v_0$, $v_1$, $v_2$, $v_3$, $v_4$, and $v_5$,) and the positions of the two reference points (e.g., "p" and "q") in the captured image are known, the volume of the box object 30 can be determined by the imaging system 50, provided that the physical distance separating the two reference points "P" and "Q" on the surface of the box object 30 has been predetermined and the imaging system 50 has been properly calibrated.

Figure 7:
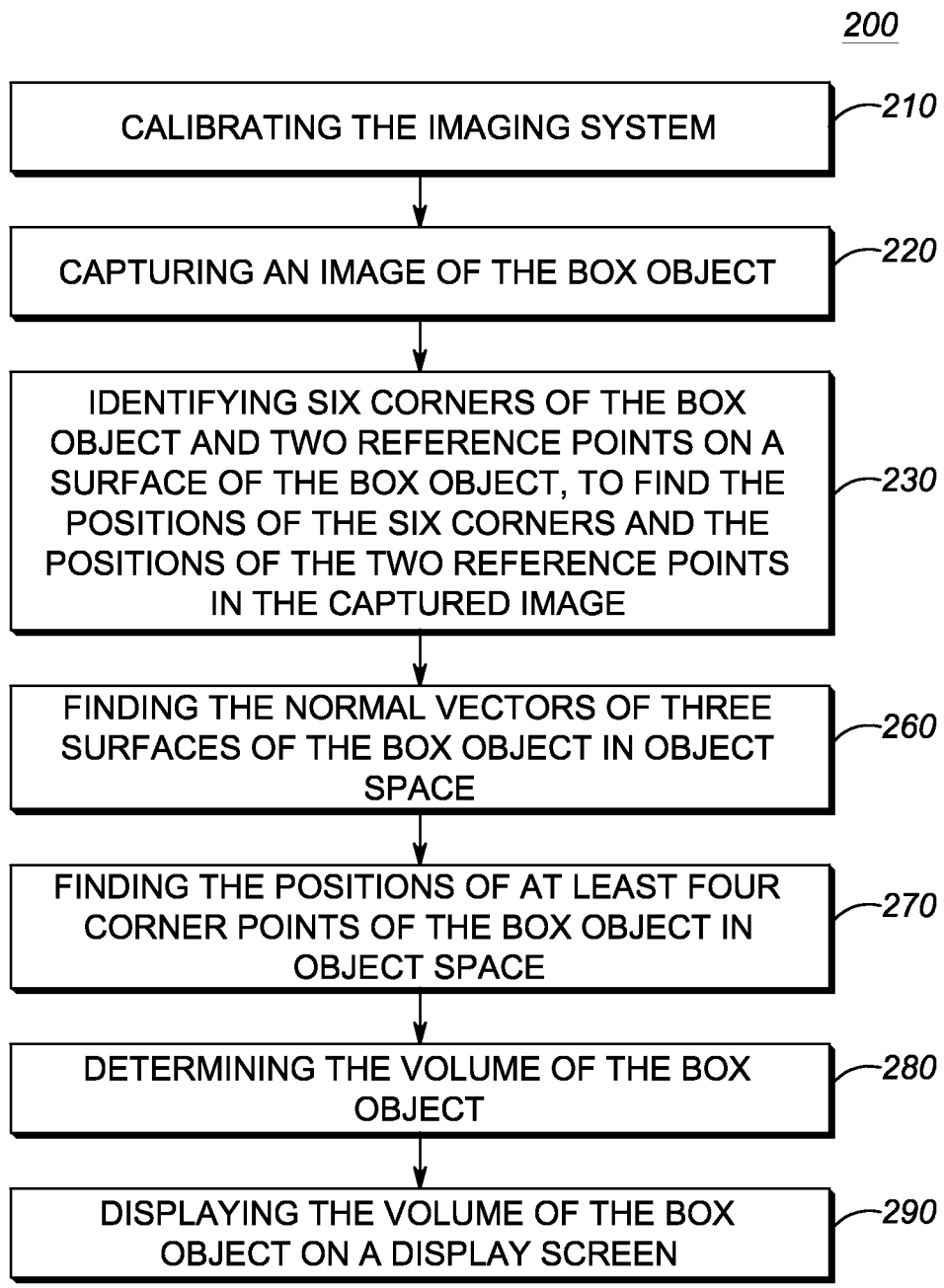
FIG. 7 is a flowchart showing a method of finding the volume of the box object in accordance with some embodiments.

FIG. 7 is a flowchart showing a method 200 of finding the volume of the box object 30 in accordance with some embodiments. The method 200 includes blocks 210, 220, 230, 260, 270, 280, and 290. At block 210, the imaging system 50 is calibrated. At block 220, an image of the box object 30 is captured (e.g., as shown in FIG. 4A). At block 230, six corners of the box object and two reference points on a surface of the box object are identified to find the positions of the six corners and the positions of the two reference points in the captured image (e.g., as shown in FIG. 4A). At block 260, the surface orientation of three faces the box object 30 are determined (e.g., the three faces $F_0$, $F_1$, and $F_2$, as shown in FIG. 3). At block 270, the positions of at least four corner points of the box object in object space are determined (e.g., four corner points $V_0$, $V_1$, $V_2$, $V_3$, as shown in FIG. 3). At block 280, the volume of the box object 30 is determined (e.g., using the height H, the width W, and the length L, as shown in FIG. 3). At block 290, the volume of the box object is displayed on a display screen (e.g., as shown in FIG. 4B).

In some implementations, before the box dimensions are displayed on the display screen as shown in FIG. 4B, the captured image of the box object 30 is displayed on the display screen as shown in FIG. 4A. In some implementations, after the image of the box object 30 is captured, the captured image of the box object 30 is displayed on the display screen to allow a user to select or confirm the corner points of the box object in the captured image and to select or confirm the reference points on the surface of the box object in the captured image. The user can initiate the calculation of the box dimensions or the calculation of the box dimensions the volume by clicking on the soft menus on the display, such as, the graphics icons labeled "Measure" and "Retry" as shown in FIG. 4A.

Figure 8:
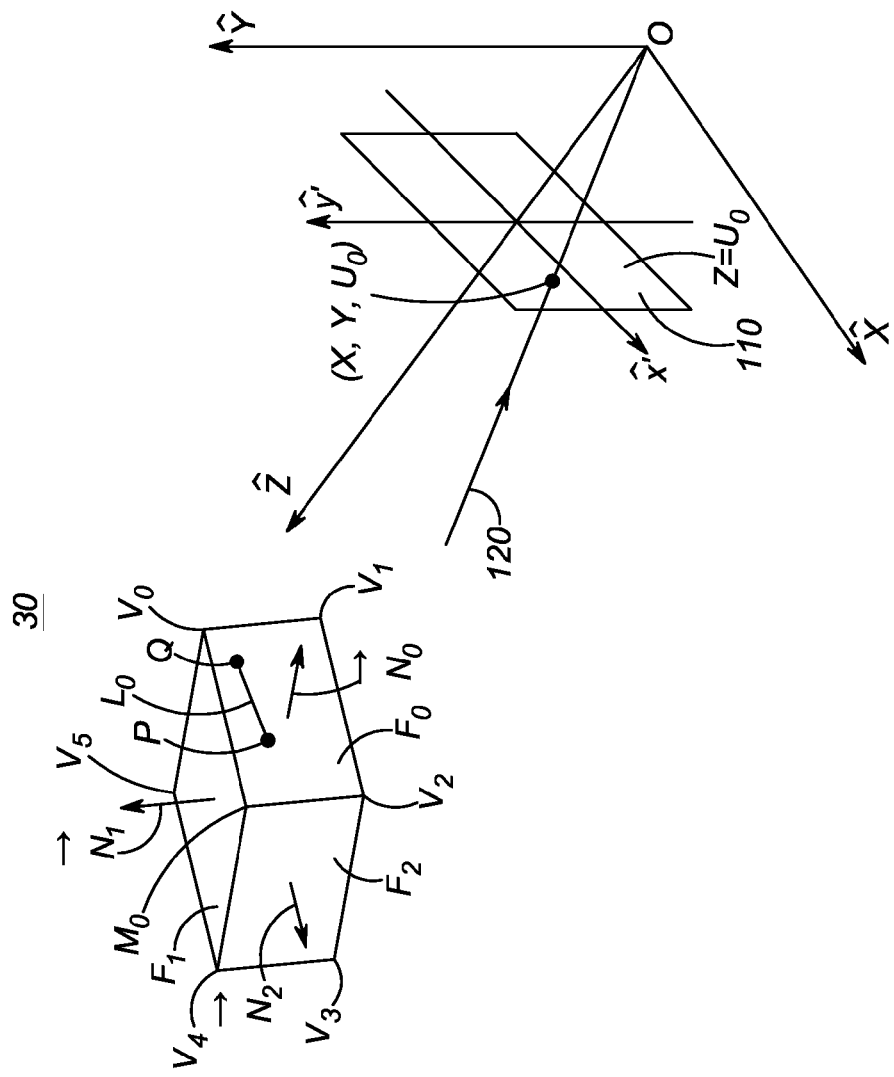
FIG. 8 shows the box object in a device coordinate $O\hat{X}\hat{Y}\hat{Z}$ in accordance with some embodiments.

In the following, the operations in the method 200 of FIG. 7 are explained in more details. In particular, the operations in block 210, the block 260, and the block 270 are explained in more details with referring to FIG. 8. FIG. 8 shows the box object 30 in a device coordinate $O\hat{X}\hat{Y}\hat{Z}$ in accordance with some embodiments. In some implementations, the device coordinate $O\hat{X}\hat{Y}\hat{Z}$ is fixed relative to the imaging system 50. The box object 30 includes corner points $V_0$, $V_1$, $V_2$, $V_3$, $V_4$, $V_5$, and $M_0$. The box object 30 also includes faces $F_0$, $F_1$, and $F_2$, with corresponding normal vectors $\vec{N}_0$, $\vec{N}_1$, and $\vec{N}_2$ respectively. There are two reference points "P" and "Q" on a surface of the box object 30. In some embodiments, the two reference points "P" and "Q" can be selected from two identifiable points on a geometric mark, such as the corner points of a barcode, a logo, or a shipping label.

In FIG. 7, at block 210, the imaging system 50 is calibrated. For each imaging system, calibration is needed to determine a mapping that is operative to establish a one-to-one corresponding relationship between a point in an image plane of the imaging sensor and a point in a reference plane in physical space. In some implementations, the reference plane in physical space can be a plane located at a known position and orientated perpendicular to the optical axis of the imaging system. In FIG. 8, the reference plane 110 can be described by equation $Z=U_0$ in the device coordinate $O\hat{X}\hat{Y}\hat{Z}$. In some implementations, the calibration process at block 210 can be used to determine a mapping that maps a pixel point (x, y) in the imaging sensor to a point (x', y', $U_0$) on the reference plane 110 in the device coordinate $O\hat{X}\hat{Y}\hat{Z}$. Any point on the light ray 120 can be identified as (x'Z/$U_0$, y'Z/$U_0$, Z), and light from such point will strike on the pixel point (x, y) in the imaging sensor. In some implementations, the reference plane 110 is selected to be at one unit distance from the origin "O" of the device coordinate $O\hat{X}\hat{Y}\hat{Z}$, that is, $U_0=1$.

In some implementations, the mapping that maps a pixel point (x, y) in the imaging sensor to a point (x', y', 1) on the reference plane 110 in the device coordinate $O\hat{X}\hat{Y}\hat{Z}$ can be equivalent to a 3×3 matrix that maps a point $(x\ y\ 1)^T$ in a homogeneous coordinate to a point $(x'\ y'\ 1)^T$ on the reference plane 110 in the device coordinate $O\hat{X}\hat{Y}\hat{Z}$. This 3×3 matrix can be represented by the product of the matrix R and the matrix $K^{-1}$, that is, $$(x'y'1)T=RK^{-1}(xy1)^T,$$

Here, the matrix R is the reflection matrix and the matrix $K^{-1}$ is the inverse of matrix K, $$K = \begin{pmatrix} \alpha_x & \gamma & u \\ 0 & \alpha_y & v \\ 0 & 0 & 1 \end{pmatrix}, \text{ and } R = \begin{pmatrix} 1 & 0 & 0 \\ 0 & -1 & 0 \\ 0 & 0 & 1 \end{pmatrix}.$$

Generally, the matrix K, which maps a point $(x\ y\ 1)^T$ in a homogeneous coordinate to a point $(x'\ y'\ 1)^T$ in the device coordinate $\hat{X}\hat{Y}\hat{Z}$, can be determined at block 210 in FIG. 7 by following some well established procedures. For example, some chessboard pattern can be presented to the imaging system 50, and the matrix K can be determined by invoking some calibration routines. The matrix K needs to be calibrated for each of different type of devices. For example, FIG. 9A shows a calibration matrix for a first example imaging system that is in the form of a digital camera implemented on a tablet computer, and FIG. 9B shows a calibration matrix for a first example imaging system that is in the form of a digital camera implemented on a smartphone.

It should be noted that the matrix K is just one example representation of a mapping that is operative to establish a one-to-one corresponding relationship between a point in an image plane of the imaging sensor and a point in a reference plane in physical space, other representations are also possible, and there are other methods to establish a one-to-one corresponding relationship between a point in an image plane of the imaging sensor and a point in a reference plane in physical space. The imaging system can be calibrated before the imaging system is used to capture the image of the box object 30. The imaging system can also be calibrated after the imaging system is used to capture the image of the box object 30.

In FIG. 7, at block 220 of the method 200, an image of the box object 30 is captured. In some implementations, such image can be a single image captured by the imaging system after receiving a triggering event, such as, the pulling of a trigger. In some implementations, such image can be a frame selected from a stream of video frames. In some implementations, such image can be a processed image that is obtained from some image-processing process operating on multiple images; each of the multiple images can be a frame selected from a stream of video frames. In some implementations, consecutive frames of the same object captured by the same imaging system can be used to auto-calibrate the device and estimate the measurement error of the measured object.

In FIG. 7, after the image of the box object 30 is captured, at block 230 of the method 200, six corners of the box object and two reference points on a surface of the box object are identified (e.g., as shown in FIG. 4A) to find the positions of the six corners (e.g., $v_0$, $v_1$, $v_2$, $v_3$, $v_4$, and $v_5$) and the positions of the two reference points (e.g., "p" and "q") in the captured image.

Figure 10A:
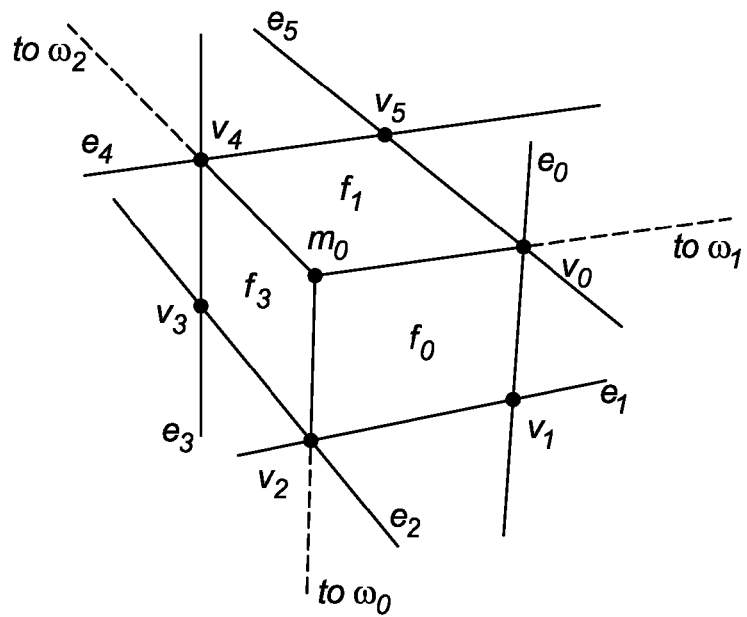
FIG. 10A shows the positions of the corner points of the box object in the captured image and the lines for identifying the edges of the box object in accordance with some embodiments.

In FIG. 7, at block 260 of the method 200, the normal vectors $\vec{N}_0$, $\vec{N}_1$, and $\vec{N}_2$—which are respectively corresponding to faces $F_0$, $F_1$, and $F_2$ of the box object 30 as shown in FIG. 8—are determined Specifically, as shown in FIG. 10A, using the positions of the six corner points (e.g., $v_0$, $v_1$, $v_2$, $v_3$, $v_4$, and $v_5$) of the box object, the location and the orientation of the lines (e.g., $e_0$, $e_1$, $e_2$, $e_3$, $e_4$, and $e_5$) for identifying the edges of the box object can be obtained. Using these lines $e_0$, $e_1$, $e_2$, $e_3$, $e_4$, and $e_5$, the normal vectors $\vec{N}_0$, $\vec{N}_1$, and $\vec{N}_2$ can be determined.

People skilled in the art may find many methods to find the normal vectors $\vec{N}_0$, $\vec{N}_1$, and $\vec{N}_2$ from the positions of the six corner points $v_0$, $v_1$, $v_2$, $v_3$, $v_4$, and $v_5$ in the captured image. One of such methods relies on the technique of multiple view geometry, as descried, for example, by R. I. Hartley and A. Zisserman, in a reference titled "Multiple View Geometry in Computer Vision", published by Cambridge University Press, 2000.

Figure 10B:
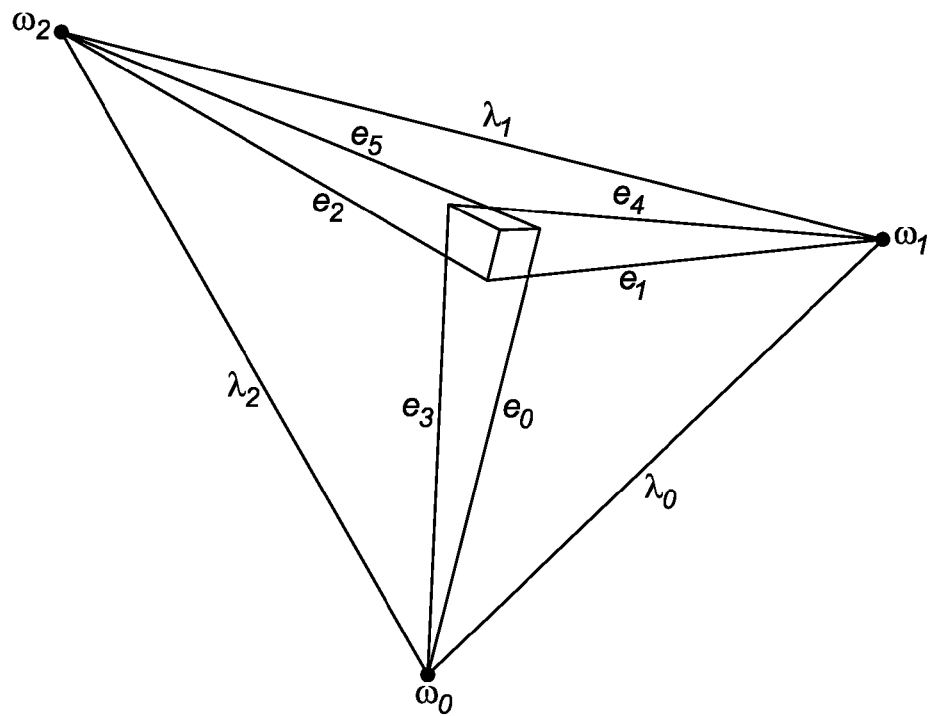
FIG. 10B shows the vanishing lines and vanishing points in the captured image are obtained in accordance with some embodiments.

With multiple view geometry, points and lines are represented by vectors in projective space. As shown in FIG. 10A and FIG. 10B, each of the vanishing points $\vec{\omega}_i$ can be calculated from the cross product of two lines selected from lines $\vec{e}_0$, $\vec{e}_1$, $\vec{e}_2$, $\vec{e}_3$, $\vec{e}_4$, and $\vec{e}_5$; that is, $\vec{\omega}_i = \vec{e}_i \times \vec{e}_{i+3}$, for i=0, 1, and 2. As shown in FIG. 10B, each of the vanishing lines $\vec{\lambda}_i$ can be calculated from the cross product of two vanishing points selected from vanishing points $\vec{\omega}_0$, $\vec{\omega}_1$, and $\omega_2$; that is, $\vec{\lambda}_i = \omega_i \times \vec{\omega}_{(i+3) mod\ 3}$, for i=0, 1, and 2. The normal vectors $\vec{N}_0$, $\vec{N}_1$, and $\vec{N}_2$ can be calculated from the vanishing lines $\vec{\lambda}_i$ and the matrix K that maps a point (x y 1)$^T$ in a homogeneous coordinate to a point (x' y' 1)$^T$ in the device coordinate $O\hat{X}\hat{Y}\hat{Z}$. Specifically, with a representation in which $\vec{N}_i = (A_i\ B_i\ C_i)^T$ and $\vec{\lambda}_i = (\lambda_{ix}\ \lambda_{iy}\ \lambda_{iz})^T$, the normal vector is given by the following equation:

$$(A_i\ B_i\ C_i)^T = \frac{1}{\|RK^T\|} RK^T(\lambda_{ix}\ \lambda_{iy}\ \lambda_{iz})^T,$$

for i=0, 1, and 2, with R being the reflection matrix.

In the method 200 as shown in FIG. 7, after the normal vectors $\vec{N}_0$, $\vec{N}_1$, and $\vec{N}_2$ are determined at block 260, the positions of at least four corner points of the box object 30 in object space is determined at block 270. In the device coordinate $O\hat{X}\hat{Y}\hat{Z}$, as shown in FIG. 8, any point (X Y Z)$^T$ on the faces $F_0$, $F_1$, or $F_2$ of the box object 30 needs to satisfy one of the corresponding linear equations $A_iX + B_iY + C_iZ = D_1$, with i=0, 1, or 2. The position of such point (X Y Z)$^T$ in the device coordinate can be determined from the position (x, y) of its corresponding point in the captured image:

$$(XYZ)^T = (x'Zy'ZZ)^T = (x'y'1)^TZ,$$

where $(x'\ y'\ 1)^T = RK^{-1}(x\ y\ 1)^T$.

After the normal vectors $\vec{N}_0$, $\vec{N}_1$, and $\vec{N}_2$ are determined, if the distance $L_0$ between the two reference points "P" and "Q" on the surface of the box object 30 is also known, it will be possible to determine the remaining unknown parameters $D_0$, $D_1$, and $D_2$ for describing all three faces $F_0$, $F_1$, and $F_2$ with linear equations $A_iX + B_iY + C_iZ = D$. In the device coordinate $O\hat{X}\hat{Y}\hat{Z}$, as shown in FIG. 8, the position of the reference point "P" is $(X_P\ Y_P\ Z_P)^T$, and the position of the reference point "Q" is $(X_Q\ Y_Q\ Z_Q)^T$. The distance between the two reference points "P" and "Q" is $$\sqrt{(X_P-X_Q)^2+(Y_P-Y_Q)^2+(Z_P-Z_Q)^2}=L_0$$

In one embodiment, as shown in FIG. 8, if the two reference points "P" and "Q" are located on the surface $F_0$ of the box object 30, the positions of these points "P" and "Q" respectively satisfy linear equations $$A_0X_P+B_0Y_P+C_0Z_P=D_0 \text{ and } A_0X_Q+B_0Y_Q+C_0Z_Q=D_0.$$

The positions of the points "P" and "Q" in the device coordinate $O\hat{X}\hat{Y}\hat{Z}$ is related to the positions of the points "p" and "q" in the captured image. Specifically, if the position of the point "p" in the captured image is $(x_P\ y_P)$ and the position of the point "q" in the captured image is $(x_Q\ Y_Q)$, the positions of the points "P" and "Q" in the device coordinate are related by the following equations:

$$(X_PY_PZ_P)^T = (x'_Py'_P1)^TZ_P, \text{ and}$$

$$(X_QY_QZ_Q)^T = (x'_Qy'_Q1)^TZ_Q.$$

with $$(x'_Py'_P1)^T = RK^{-1}(x_Py_P1)^T, \text{ and}$$

$$(x'_Qy'_Q1)^T = RK^{-1}(x_Qy_Q1)^T.$$

From above equations, it can be determined that $$Z_P = \frac{L_0}{\sqrt{(x'_P-kx'_Q)^2+(y'_P-ky'_Q)^2+(1-k)^2}}$$

with $$k = \frac{A_0x'_P+B_0y'_P+C_0}{A_0x'_Q+B_0y'_Q+C_0} = \frac{Z_Q}{Z_P}$$

After the position $(X_P\ Y_P\ Z_P)^T$ of the point "P" is determined, the position $(X\ Y\ Z)^T$ of any point on the surface $F_0$ in the device coordinate $O\hat{X}\hat{Y}\hat{Z}$ can be determined from the position of its corresponding point in the captured image. In particular, the position $(X_i\ Y_i\ Z_i)^T$ of the corner point $V_i$ as shown in FIG. 8—for i=0, 1, or 2—can be determined from the position $(x_i\ y_i)$ of the corner point $v_i$ in the captured image as shown in FIG. 10. Specifically, the positions $(X_0\ Y_0\ Z_0)^T$, $(X_1\ Y_1\ Z_1)^T$, and $(X_2\ Y_2\ Z_2)^T$ can be determined from the following equations:

$$(X_i\ Y_i\ Z_i)^T = (x'_i\ y'_i\ 1)^T Z_P \frac{A_0x'_P+B_0y'_P+C_0}{A_0x'_i+B_0y'_i+C_0}$$

with $$(x'_i\ y'_i\ 1)^T = RK^{-1}(x_i\ y_i\ 1)^T,$$

for i=0, 1, and 2. Similarly, the position of the corner point $M_0$ as shown in FIG. 8 can be determined from the position of the corner point $m_0$ in the captured image as shown in FIG. 10.

After the position $(X_0\ Y_0\ Z_0)^T$ of the point $V_0$ is determined, the position $(X\ Y\ Z)^T$ of any point on the surface $F_1$ in the device coordinate $O\hat{X}\hat{Y}\hat{Z}$ can be determined from the position of its corresponding point in the captured image. In particular, the position $(X_5\ Y_5\ Z_5)^T$ of the corner point $V_5$ as shown in FIG. 8, can be determined from the position $(x_5\ y_5)$ of the corner point $v_5$ in the captured image as shown in FIG. 10.

$$(X_5\ Y_5\ Z_5)^T = (x'_0\ y'_0\ 1)^T Z_0 \frac{A_1x'_0+B_1y'_0+C_1}{A_1x'_5+B_1y'_5+C_1}$$

with $$(x'_5\ y'_5\ 1)^T = RK^{-1}(x_5\ y_5\ 1)^T.$$

After the position $(X_2\ Y_2\ Z_2)^T$ of the point $V_2$ is determined, the position $(X\ Y\ Z)^T$ of any point on the surface $F_2$ in the device coordinate $O\hat{X}\hat{Y}\hat{Z}$ can be determined from the position of its corresponding point in the captured image. In particular, the position $(X_i\ Y_i\ Z_i)^T$ of the corner point $V_i$ as shown in FIG. 8—for i=3 or 4—can be determined from the position $(x_i\ y_i)$ of the corner point $v_i$ in the captured image as shown in FIG. 10. Specifically, the positions $(X_3\ Y_3\ Z_3)^T$ and $(X_4\ Y_4\ Z_4)^T$ can be determined from the following equations:

$$(X_i\ Y_i\ Z_i)^T = (x'_i\ y'_i\ 1)^T Z_2 \frac{A_2x'_2+B_2y'_2+C_2}{A_2x'_i+B_2y'_i+C_2}$$

with $$(x'_i\ y'_i\ 1)^T = RK^{-1}(x_i\ y_i\ 1)^T$$

for i=3 and 4.

In the method 200 as shown in FIG. 7, after the positions of at least four corner points of the box object in object space are determined at block 270, the volume of the box object 30 is determined at block 280. In some implementations, the volume of the box object 30 can be determined directly from the positions of the at least four corner points of the box object in object space. In some implementations, the box dimensions including the width, the length, and the height of the box object 30 are determined first before the volume of the box object 30 is calculated. In the method 200 as shown in FIG. 7, proceeding from block 280 to block 290, the volume of the box object is displayed on a display screen. In some implementations, after the positions of at least four corner points are determined at block 270, the width, the length, and the height of the box object 30 are determined and displayed on a display screen as shown in FIG. 4B.

Figure 11A:
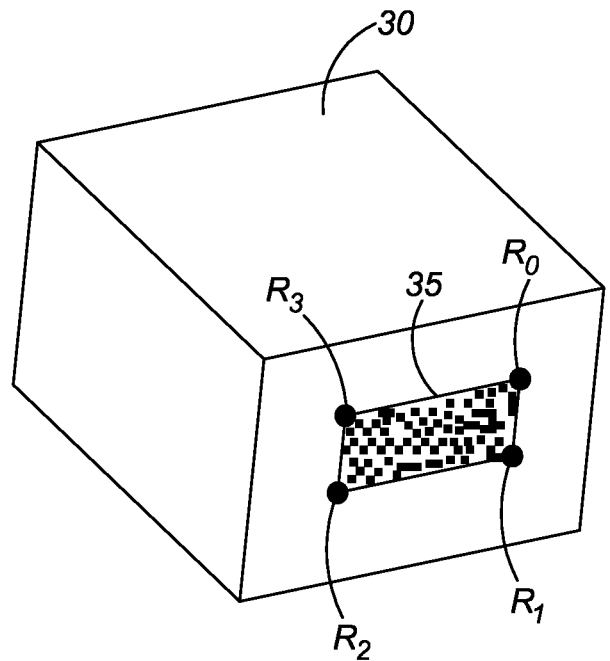
FIGS. 11A-11B and FIG. 12 illustrate an alternative embodiment for determining the normal vector of a face of the box object in accordance with some embodiments.
Figure 11B:
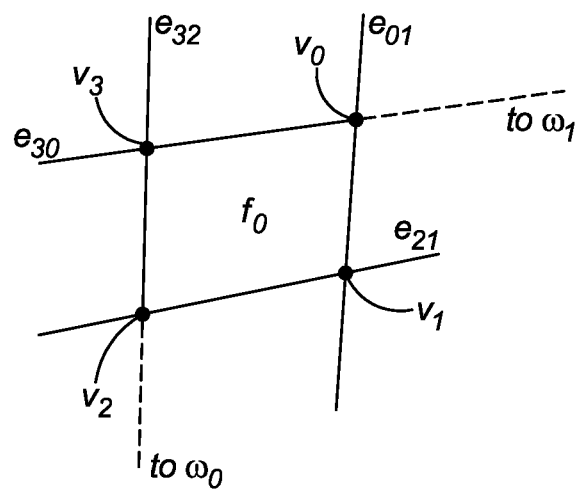

FIGS. 11A-11B illustrate an alternative embodiment for determining the normal vector of a face of the box object in accordance with some embodiments. In FIG. 11A, a two-dimensional barcode 35 is placed on a face of the box object 30, and the corner points of the barcode 35 are used as reference points $R_0$, $R_1$, $R_2$, and $R_3$. In the captured image of the box object 30, as shown in FIG. 11B, the corner points of the barcode 35 are $r_0$, $r_1$, $r_2$, and $r_3$. The line connecting the points $r_0$ and $r_1$ is $e_{01}$, the line connecting the points $r_3$ and $r_2$ is $e_{32}$, the line connecting the points $r_3$ and $r_0$ is $e_{30}$, and the line connecting the points $r_2$ and $r_1$ is $e_{21}$. With multiple view geometry, the vanishing points be calculated from the cross product of two lines selected from lines $\vec{e}_{01}$, $\vec{e}_{32}$, $\vec{e}_{30}$, and $\vec{e}_{21}$. Specifically, $\vec{\omega}_0 = \vec{e}_{01} \times \vec{e}_{32}$, and $\vec{\omega}_1 = \vec{e}_{30} \times \vec{e}_{21}$. Vanishing line $\vec{\lambda}_0$ can be calculated from the cross product of the vanishing points, that is, $\vec{\lambda}_0 = \vec{\omega}_0 \times \vec{\omega}_1$. The normal vectors $\vec{N}_0$ of the face $F_0$ can be calculated from the vanishing lines $\vec{\lambda}_0$ and the matrix K that maps a point $(x\ y\ 1)^T$ in a homogeneous coordinate to a point $(x'\ y'\ 1)^T$ in the device coordinate $O\hat{X}\hat{Y}\hat{Z}$.

Additionally, if the distance between any two of the four reference points $R_0$, $R_1$, $R_2$, and $R_3$ is known, the position $(X\ Y\ Z)^T$ of any point on the surface $F_0$ in the device coordinate $O\hat{X}\hat{Y}\hat{Z}$ can be determined from the position of its corresponding point in the captured image. If the normal vectors $\vec{N}_1$ and $\vec{N}_2$ of faces $F_1$ and $F_2$ are also determined independently, such as, from additional corner points of the box object, the dimensions and the volume of the box object can be determined. In one embodiment, vanishing point $\vec{\omega}_2$ can be determined from four corner points of the box object, such as, points $V_0$, $V_2$, $V_3$, and $V_5$—as shown in FIG. 8—in the captured image. In such embodiment, using the newly determined $\omega_2$ and previously determined vanishing points $\vec{\omega}_0$ and $\vec{\omega}_1$, the normal vectors $\vec{N}_1$ and $\vec{N}_2$ of faces $F_1$ and F2 can be determined. If a fifth corner point (e.g., the point $V_1$, or $M_0$) in the captured image is also identified, all required dimensions for determining the volume of the box object 30 (e.g., the width, the length, and the height) can all be subsequently calculated.

In another embodiment, vanishing point $\vec{\omega}_2$ can be determined from four reference points on the face $F_1$ or the face $F_2$. For example, these four reference points can be the corner points of another shipping label (or another barcode) placed on the face $F_1$ or the face $F_2$. In this embodiment, four corner positions (e.g., the points $V_0$, $V_1$, $V_2$, and $V_3$—as shown in FIG. 8) of the box object 30 will be sufficient to determine the volume of the box object.

Figure 12:
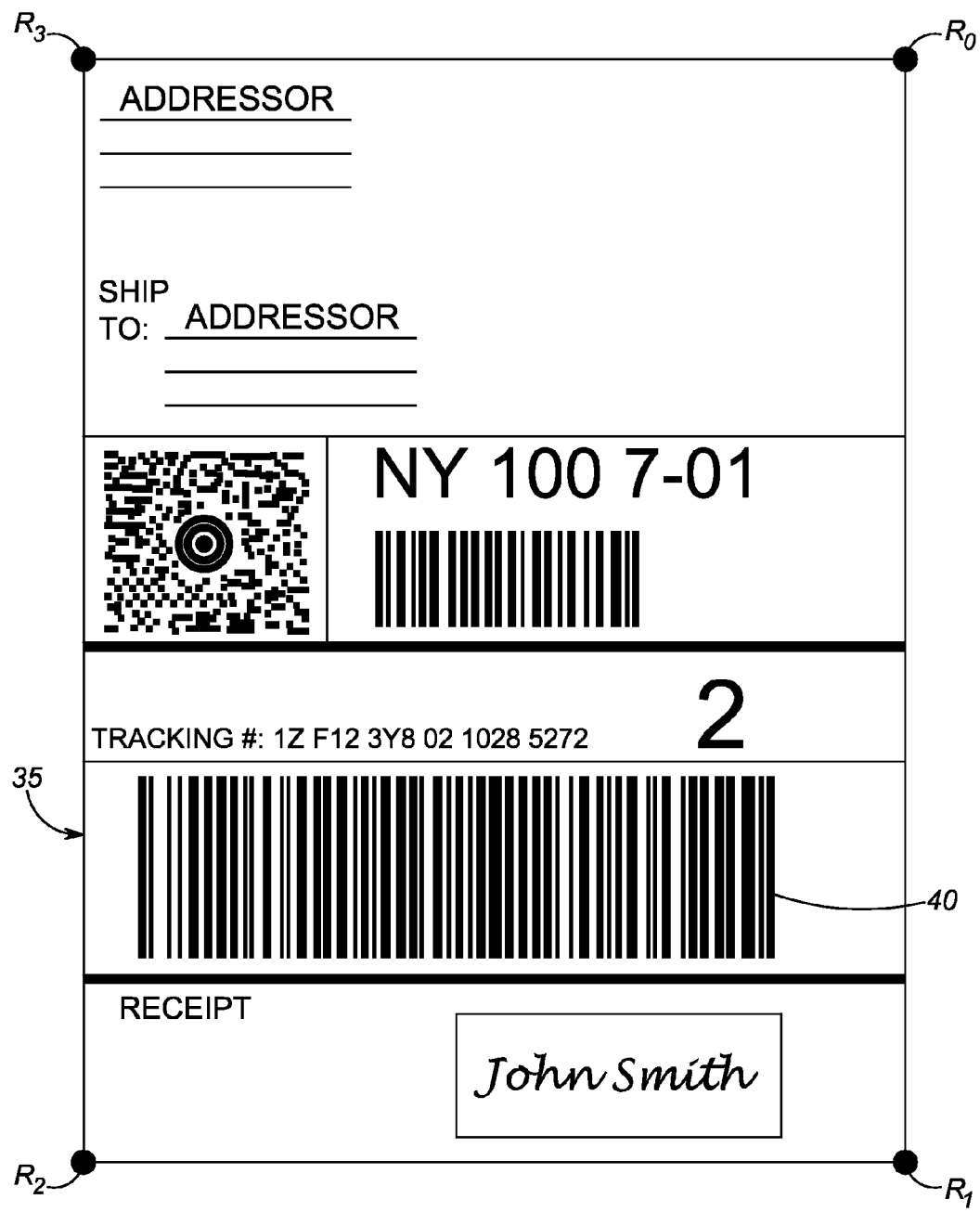

In another implementation as shown in FIG. 12, a shipping label 35 is placed on a face of the box object 30, and the corner points of the shipping label 35 are used as reference points, $R_0$, $R_1$, $R_2$, and $R_3$, for determining the normal vectors $\vec{N}_0$ of the face $F_0$, and for determining the position $(X\ Y\ Z)^T$ of any point on the surface $F_0$ in the device coordinate $O\hat{X}\hat{Y}\hat{Z}$. In some implementations, not all of the reference points, $R_0$, $R_1$, $R_2$, and $R_3$ need to be the corner points of the shipping label (or the barcode); that is, one or more identifiable points on the shipping label (or the barcode) can also be used as the reference points. In some implementations, one or more corner points of the box object 30 can also be used as the reference points.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

For example, people skilled in the art may find many methods to find the normal vectors $\vec{N}_0$, $\vec{N}_1$, and $\vec{N}_2$ in FIG. 8 from the positions of the six corner points $v_0$, $v_1$, $v_2$, $v_3$, $v_4$, and $v_5$ in the captured image as shown in FIG. 10. People skilled in the art may also find many methods to find the normal vectors $\vec{N}_0$, $\vec{N}_1$, and $\vec{N}_2$ in FIG. 8 from the positions of the six corner points $v_0$, $v_1$, $v_2$, $v_3$, $v_4$, and $m_0$ in the captured image as shown in FIG. 10. In addition, for the method 200 as described in FIG. 7, more than six corner points can be used to find the normal vectors $\vec{N}_0$, $\vec{N}_1$, and $\vec{N}_2$, and the redundancy of the corner points can be used to improve the accuracy of the results based on some known methods, such as, curve fitting, parameter fitting, or result-averaging. Similarly, more than two reference points on a geometric mark (e.g., a shipping label, or a logo) on the surface of the box object can be used to improve the accuracy of the final results, such as, the accuracy of the volume or the box dimensions that are estimated from the captured image. Additionally, for the method as described with respect to FIGS. 11A-11B, more than four reference points on a geometric mark on the surface of the box object can be used to improve the accuracy of the final results, and more than five corner points of the box object can also be used to improve the accuracy of the final results.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    detecting light from a box object through an imaging lens arrangement with an imaging sensor having two-dimensional photosensitive elements to capture at least one image of the box object, wherein the box object has the shape of a rectangular solid;
    identifying a geometric mark with fixed dimensions on the box object in the at least one image to find positions of at least two reference points of the geometric mark in the at least one image, wherein the at least two reference points are separated by a predetermined distance;
    identifying corners of the box object in the at least one image;
    determining, using a processor and based on the corners identified in the at least one image, normal vectors corresponding to orientations of faces of the box object;
    determining, using the processor and based on (i) the normal vectors and (ii) the positions of the at least two reference points, positions of at least four corner points of the box object in an object space;
    determining, using the processor and based on the positions of the at least four corner points in the object space, dimensions of the box object, with the box dimensions including the width, the length, and the height of the box object.

2. The method of claim 1, wherein the geometric mark includes one of a barcode, a logo, and a shipping label.

3. The method of claim 1, wherein the geometric mark includes two isolated point marks.

4. The method of claim 1, further comprising:
    identifying edges of the box object based on the corners identified in the at least one image, wherein determining the normal vectors is further based on the identified edges.

5. The method of claim 1, further comprising:
    finding positions of at least four reference points of the geometric mark in the at least one image.

6. The method of claim 1, further comprising:
    finding positions of at least four reference points of the geometric mark in the at least one image; and
    finding positions of at least four reference points of another geometric mark in the at least one image.

7. A method comprising:
    detecting light from a box object through an imaging lens arrangement with an imaging sensor having two-dimensional photosensitive elements to capture at least one image of the box object, wherein the box object has the shape of a rectangular solid;
    identifying at least two reference points on a surface of the box object to find positions of the at least two reference points in the at least one image, wherein the at least two reference points are two fixed points that are stationary in a coordinate fixed on the box object and the at least two reference points are separated by a predetermined distance on the surface of the box object, the predetermined distance being independent of geometric orientation of the box object;
    identifying corners of the box object in the at least one image;

determining, using a processor and based on the corners of the box object, normal vectors indicative of face orientations corresponding to surfaces of the box object;

determining, using the processor and based on (i) the normal vectors, (ii) the positions of the at least two reference points, and (iii) the predetermined distance separating the at least two reference points, positions of at least four corner points of the box object in an object space;

determining, using the processor, dimensions of the box object based on the positions of the at least four corner points in the object space, with the box dimensions including the width, the length, and the height of the box object.

8. The method of claim 7, further comprising:
determining a mapping in a calibration process.

9. The method of claim 8, wherein the mapping is operative to establish a one-to-one corresponding relationship between a point in an image plane of the imaging sensor and a point in a reference plane in physical space.

10. The method of claim 8, wherein the mapping is a matrix that models intrinsic parameters of an imaging system that includes the imaging lens arrangement and the imaging sensor.

11. The method of claim 7, further comprising:
determining a volume of the box object based on the dimensions.

12. The method of claim 7, further comprising:
displaying the width, the length, and the height of the box object.

13. The method of claim 7, further comprising:
displaying at least one of the width, the length, and the height of the box object.

14. The method of claim 7, further comprising:
identifying at least six corners of the box object to find the positions of the at least six corners in the at least one image.

15. The method of claim 7, further comprising:
processing multiple images to identify the corners of the box object.

16. The method of claim 7, further comprising:
identifying edges of the box object based on the corners identified in the at least one image, wherein determining the normal vectors is further based on the identified edges.

17. The method of claim 7, further comprising:
processing the at least one image to identify at least one of the at least two reference points.

18. The method of claim 7, further comprising:
processing the at least one image to identify all of the at least two reference points.

19. The method of claim 7, further comprising:
displaying the at least one image of the box object on a display screen; and
identifying at least one corner of the box object with a user-selected position on the display screen.

20. The method of claim 7, further comprising:
displaying the at least one image of the box object on a display screen; and
identifying at least one of the reference points with a user-selected position on the display screen.

21. An apparatus comprising:
an imaging lens arrangement;
an imaging sensor having two-dimensional photosensitive elements configured to detect light from a box object through the imaging lens arrangement and configured to capture at least one image of the box object that has the shape of a rectangular solid;
a controller operative to decode a barcode and operative to determine dimensions of the box object by:
determining positions of the two reference points on a surface of the box object in the at least one image, the two reference points being spaced apart by a known distance;
identifying corners of the box object in the at least one image;
determining normal vectors of the box object based on positions of the corners in the at least one image;
determining positions of corners of the box in an object space based on (i) the normal vectors, (ii) the positions of the two reference points in the at least one image with the two reference points being at fixed positions in a coordinate fixed on the box object, and (iii) a predetermined mapping operative to establish a one-to-one corresponding relationship between a point in an image plane of the imaging sensor and a point in physical space.

22. The apparatus of claim 21, comprising:
a display screen operative to display the at least one image of the box object and to display a user-selected position specifying at least one corner of the box object in the at least one image.

23. The apparatus of claim 21, comprising:
a display screen operative to display the at least one image of the box object and to display a user-selected position specifying at least one of the two reference points in the at least one image.

* * * * *